US006417261B1

(12) United States Patent
Maier et al.

(10) Patent No.: US 6,417,261 B1
(45) Date of Patent: Jul. 9, 2002

(54) SOAP GEL BASED GLUE STICK

(75) Inventors: Wolfgang Maier, Duesseldorf; Wolfgang Klauck, Meerbusch, both of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/647,016

(22) PCT Filed: Mar. 17, 1999

(86) PCT No.: PCT/EP99/01727

§ 371 (c)(1),
(2), (4) Date: Nov. 17, 2000

(87) PCT Pub. No.: WO99/48989

PCT Pub. Date: Sep. 30, 1999

(30) Foreign Application Priority Data

Mar. 26, 1998 (DE) .......................................... 198 13 392

(51) Int. Cl.[7] .......................... C08K 5/098; C08L 75/04
(52) U.S. Cl. ........................................ 524/394; 524/507
(58) Field of Search .................................. 504/394, 507

(56) References Cited

U.S. PATENT DOCUMENTS

| 3,576,776 A | 4/1971 | Muszik et al. ................. 260/22 |
| 3,817,887 A | 6/1974 | Mestetsky ..................... 260/23 |
| 4,011,311 A | 3/1977 | Noomen et al. ............... 424/65 |
| 5,371,131 A | 12/1994 | Gierenz et al. ............. 524/394 |

FOREIGN PATENT DOCUMENTS

| CA | 928323 | 6/1973 |
| DE | 1 811 466 | 8/1969 |
| DE | 2 035 732 | 1/1972 |
| EP | 0 405 329 | 1/1991 |
| EP | 0 506 300 | 9/1992 |
| FR | 2 227 311 | 11/1974 |

*Primary Examiner*—Tae H. Yoon
(74) *Attorney, Agent, or Firm*—Stephen D. Harper; Arthur G. Seifert

(57) ABSTRACT

Adhesive sticks are obtained using water-based preparations of synthetic polymers of adhesive character and soaps which act as shaping gel-forming components. Mixtures of polyurethanes and polyvinyl pyrrolidone are used as the synthetic polymers. The polyurethane may be in the form of a dispersion and produced by reacting at least one polyol, at least one polyfunctional isocyanate and a component capable of salt formation in alkaline aqueous solution and/or a nonionic hydrophilic modifying agent.

24 Claims, No Drawings

SOAP GEL BASED GLUE STICK

BACKGROUND OF THE INVENTION

1. Field of the Invention

This invention relates to an adhesive stick produced from a water-based preparation of a synthetic polymer of adhesive character and a soap gel as the shaping gel-forming component and, optionally, other auxiliaries. The invention also relates to a process for the production of such sticks and to their use.

2. Discussion of the Related Art

Adhesive sticks (=dimensionally stable stick-like adhesives which leave behind a tacky film when rubbed onto a receiving surface) are now part of everyday life. They contain water-soluble or water-dispersible synthetic polymers of adhesive character dissolved in an aqueous organic liquid phase together with a shaping gel-form component. The gel-forming component is selected in particular from alkali metal or ammonium salts of aliphatic carboxylic acids, more particularly containing from about 12 to 22 carbon atoms. If the basically high-tack water-based preparations of the synthetic polymers of adhesive character are heated together with small quantities of the gel-forming component based on fatty acid soaps to relatively high temperatures, more particularly above 50° C., and if this solution is subsequently left standing to cool, the mixture solidifies to a more or less stiff soap gel in which the shaping and comparatively rigid micelle structure of the soap gel is predominantly in evidence at first. This provides for the known production and handling of such adhesives in stick form in closable tubes. When the stick is rubbed onto a receiving surface, the micelle structure is destroyed so that the rigid mixture is converted into a paste-like state in which its adhesive character is predominant.

Originally, the polyvinyl pyrrolidone (PVP) mentioned in DE 18 11 466 proved to be the most important polymer of adhesive character. Although the adhesive sticks made with polyvinyl pyrrolidone offered sufficient strength for gluing paper, there was still a need to obtain sticks which could be used more universally and with which bonds of greater strength could be produced. In particular, there was a need to prevent paper/paper bonds established with the sticks from separating again under climatically unfavorable conditions. The use of polyurethane as the polymer of adhesive character contributed towards solving that problem.

EP 405 329 describes firm, soft-rubbing adhesive sticks based on a soap gel as the shaping gel-forming component and an aqueous poly-urethane dispersion as the adhesive component. The polyurethane is a reaction product of a polyol or a polyol mixture, a difunctional or poly-functional isocyanate component, a component capable of salt formation in alkaline aqueous solution and/or a nonionic hydrophilic modifying agent and, optionally, a chain-extending agent. Although improvements were in fact obtained in this way, the strengths and heat resistance values were still not good enough for special cases.

SUMMARY OF THE INVENTION

Accordingly the problem addressed by the present invention was to provide a dimensionally stable soft-rubbing composition which would not have any of these disadvantages and which would be distinguished not only by easy handling, but also by favorable performance properties. In particular, easy application would be combined with initial repositionability of the bond and high tack would be combined with high ultimate strength and also with high heat resistance.

The solution provided by the invention is defined in the claims and consists essentially in the use of a mixture of polyurethane and polyvinyl pyrrolidone as the synthetic polymer of adhesive character.

DETAILED DESCRIPTION OF THE INVENTION

The adhesive stick is "dimensionally stable" because its constituent composition is capable of forming stable geometric shapes at room temperature (20° C.). More particularly, an adhesive stick with a diameter of 16 mm should have a deformation load of 25 to 50 N as measured by the compressive strength method described hereinafter at a temperature of 20° C.

The constituent paste of the adhesive stick is preferably "soft-rubbing" because a uniform film without any unevenness is obtained on copying paper (Sonnecken 5015 Speziell Copier) under low pressure (see "rubbing" test).

An "water-based preparation" in the context of the invention is understood to be an aqueous mixture of the polymers irrespective of the degree of dispersion (true solution, colloidal solution or dispersion).

The adhesive sticks according to the invention contain a polyurethane (PU) as the adhesive polymer component. The polyurethane is a reaction product of at least one polyol, at least one polyfunctional isocyanate, at least one component capable of salt formation in alkaline aqueous solution and/or a nonionic hydrophilic modifying agent and, optionally, at least one chain-extending agent.

According to the invention, polyurethane dispersions are preferred starting materials for adhesive sticks which are opaque, translucent or transparent in appearance and in which the polymer would appear to be present at least partly in solution. The specialist knowledge of the poly-urethane expert, who can influence the degree of distribution through the percentage content of ionic and/or nonionic constituents, is relevant in this regard. Accordingly, the water-based preparation preferably contains the polyurethane in the form of a dispersion.

The polyurethane dispersions used as synthetic polymer in adhesive sticks are prepared from a polyol or a polyol mixture as an essential starting product. Broadly speaking, these polyols should contain at least two reactive hydrogen atoms and should be substantially linear, although they may also be branched. Their molecular weight is in the range from 300 to 40,000 and preferably in the range from 500 to 20,000. Suitable polyols are polyester polyols, polyacetal polyols, polyether polyols, polythioether polyols, polyamide polyols or polyester amide polyols containing 2 to 4 hydroxyl groups which may also be partly replaced by amino groups. Polyurethanes of polyether and/or polyester polyols are preferred.

Suitable polyether polyols are, for example, the polymerization products of ethylene oxide, propylene oxide, butylene oxide and their copolymerization or graft polymerization products and the polyethers obtained by condensation of polyhydric alcohols or mixtures thereof and those obtained by alkoxylation of polyhydric alcohols, amines, polyamines and aminoalcohols. Isotactic polypropylene glycol may also be used. The preferred polyether polyol is polytetrahydrofuran. Polytetrahydrofuran in the context of the present invention is the collective name for polyethers which can be theoretically or actually prepared by ring-opening polymerization of tetrahydrofuran and which contain a hydroxyl group at either end of the chain. Suitable products have a degree of oligomerization of about 1.5 to 150 and preferably in the range from 5 to 100.

Another preferred class of polyols are polycarbonate polyols. Preferred polycarbonate polyols are aliphatic types, i.e. esters of carbonic acid with dihydric $C_{2-10}$ alcohols. Polycarbonate polyols based on carbonic acid and bisphenol A are less suitable.

Suitable polyacetal polyols are, for example, the compounds obtainable from glycols, such as diethylene glycol, triethylene glycol, 4,4-dioxethoxydiphenyl dimethyl methane, hexanediol and formaldehyde. Suitable polyacetals may also be produced by polymerization of cyclic acetals.

Among the polythioether polyols, the condensation products of thiodiglycol on its own and/or with other glycols, dicarboxylic acids, formaldehyde, aminocarboxylic acids or aminoalcohols are particularly suitable. Depending on the co-components, the products are polythioethers, polythio mixed ethers, polythioether esters, polythioether ester amides. Polyhydroxyl compounds such as these may also be used in alkylated form or in admixture with alkylating agents.

The polyester, polyester amide and polyamide polyols include the predominantly linear condensates obtained from polybasic saturated and unsaturated carboxylic acids or anhydrides thereof and polyhydric saturated and unsaturated alcohols, aminoalcohols, diamines, polyamines and mixtures thereof and, for example, polyterephthalates or polycarbonates. Polyesters of lactones, for example caprolactones, or of hydroxycarboxylic acids may also be used. The polyesters may contain terminal hydroxyl or carboxyl groups. Relatively high molecular weight polymers or condensates such as, for example, polyethers, polyacetals or polyoxymethylenes may also be used as alcohol component for their synthesis. The aqueous polyurethane dispersion preferably contains a reaction product of a polyether and/or polyester polyol as polyol component.

Polyhydroxyl compounds already containing urethane or urea groups and optionally modified natural polyols, such as castor oil, may also be used. Basically, polyhydroxyl compounds containing basic nitrogen atoms, for example polyalkoxylated primary amines or polyesters or polythioethers containing co-condensed alkyl diethanolamine, are also suitable. Polyols obtained by complete or partial ring opening of epoxidized triglycerides with primary or secondary hydroxyl compounds, for example the reaction product of epoxidized soybean oil with methanol, may also be used. The polyols may also contain aminoalcohols or diamines.

Polyisocyanates suitable for the production of the polyurethanes usable in accordance with the invention are any aromatic and aliphatic diisocyanates such as, for example, 1,5-naphthylene diisocyanate, 4,4'-diphenyl methane diisocyanate, 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenylene diisocyanate, the isomers of toluene diisocyanate, optionally in admixture, 1-methyl-2,4-diisocyanatocyclohexane, 1,6-disocyanato-2,2,4-trimethyl hexane, 1,6-diisocyanato-2,4,4-trimethyl hexane, 1-isocyanatomethyl-3-isocyanato-1,5,5-trimethyl cyclohexane, chlorinated and brominated diisocyanates, phosphorus-containing diisocyanates, 4,4'-diisocyanatophenyl perfluoroethane, tetramethoxybutane-1,4-diisocyanate, butane-1,4-disocyanate, hexane-1,6-disocyanate, dicyclohexylmethane diisocyanate, cyclohexane-1,4-diisocyanate, ethylene diisocyanate, phthalic acid-bis-isocyanatoethyl ester, also polyisocyanates containing reactive halogen atoms, such as 1-chloromethylphenyl-2,4-diisocyanate, 1-bromomethylphenyl-2,6-diisocyanate, 3,3-bis-chloromethylether-4,4'-diphenyl diisocyanate. Sulfur-containing polyisocyanates are obtained, for example, by reacting 2 moles of hexamethylene diisocyanate with 1 mole of thiodiglycol or dihydroxydihexyl sulfide. Other important diisocyanates are trimethyl hexamethylene diisocyanate, 1,4-diisocyantobutane, 1,2-diisocyanatododecane and dimer fatty acid diisocyanate. The isocyanates mentioned above may be used either individually or in the form of mixtures. Preferred isocyanates are cyclic or branched aliphatic diisocyanates, such as isophorone diisocyanate, but also hexamethylene diisocyanate. Tetramethyl xylene diisocyanate (TMXDI) is particularly preferred. Trifunctional isocyanates may also be used in small quantities. The aqueous polyurethane dispersion is preferably a reaction product of at least one difunctional or trifunctional aliphatic isocyanate.

Chain-extending agents containing reactive hydrogen may also be used in the production of the polyurethane dispersions used in accordance with the invention.

Suitable chain-extending agents containing reactive hydrogen atoms include:

the usual saturated and unsaturated glycols, such as ethylene glycol or condensates of ethylene glycol, butane-1,3-diol, butane-1,4-diol, butenediol, propane-1,2-diol, propane-1,3-diol, neopentyl glycol, hexanediol, bis-hydroxymethyl cyclohexane, dioxyethoxyhydroquinone, terephthalic acid-bis-glycol ester, succinic acid di-2-hydroxyethyl amide, succinic acid di-N-methyl-(2-hydroxyethyl)-amide 1,4-di-(2-hydroxymethylmercapto)-2,3,5,6-tetrachlorobenzene, 2-methylpropane-1,3-diol, 2-methylpropane-1,3-diol;

aliphatic, cycloaliphatic and aromatic diamines, such as ethylene diamine, hexamethylene diamine, 1,4-cyclohexylene diamine, benzidine, diaminodiphenyl methane, dichlorodiaminodiphenyl methane, the isomers of phenyl diamine, hydrazine, ammonia, carbohydrazide, adipic acid dihydrazide, sebacic acid dihydrazide, piperazine, N-methyl propylene diamine, diaminodiphenyl sulfone, diaminodiphenyl ether, diaminodiphenyl dimethyl methane, 2,4-diamino-6-phenyl triazine;

aminoalcohols, such as ethanolamine, propanolamine, butanolamine, N-methyl ethanolamine, N-methyl isopropanolamine;

aliphatic, cycloaliphatic, aromatic and heterocyclic mono- and diaminocarboxylic acids, such as glycine, 1- and 2-alanine, 6-aminocaproic acid, 4-aminobutyric acid, the isomeric mono- and diaminobenzoic acids, the isomeric mono- and diaminonaphthoic acids;

water.

The polyols used as chain-extending agents preferably have a molecular weight of less than 300. It is emphasized that it is not possible in the context of the present invention strictly to differentiate between the polyols having a molecular weight of 300 to 20,000 and the so-called "chain-extending agents" because the transitions between the two classes of compounds are fluid. Compounds which are not made up of several monomer units, but have a molecular weight of more than 300, such as 3,3'-dibromo4,4'-diaminodiphenyl methane for example, are classed as chain-extending agents, as indeed is pentaethylene glycol although, on the strength of its composition, pentaethylene glycol is actually a polyether diol.

Special chain-extending agents containing at least one basic nitrogen atom are, for example, mono-, bis- or polyalkoxylated aliphatic, cycloaliphatic, aromatic or heterocyclic primary amines, such as N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated cocofatty amine, N-allyl diethanolamine, N-methyl diisopropanolamine, N-ethyl diisopropanolamine, N-propyl diisopropanolamine, N-butyl diisopropanolamine, C-cyclohexyl diisopropanolamine, N,N-diethoxylaniline, N,N-diethoxyltoluidine, N,N-diethoxyl-1-aminopyridine, N,N'-diethoxylpiperazine, dimethyl-bis-ethoxylhydrazine, N,N'-bis-(2-hydroxyethyl)-N,N'-diethyl hexahydro-p-phenylene diamine, N-12-hydroxyethyl piperazine, polyalkoxylated amines, such as propoxylated methyl diethanolamine, also such compounds as N-methyl-N,N-bis-3-aminopropyl amine, N-(3-aminopropyl)-N,N'-dimethyl ethylene diamine, N-(3-aminopropyl)-N-methyl ethanolamine, N,N'-bis-(3-aminopropyl)-N,N'-dimethyl ethylene diamine, N,N'-bis-(3-aminopropyl)-piperazine, N-(2-aminoethyl)-piperazine, N,N'-bis-hydroxyethyl propylene diamine, 2,6-diaminopyridine, diethanolaminoacetamide, diethanolamidopropionamide, N,N-bis-hydroxyethyl phenyl thiosemicarbazide, N,N-bis-hydroxyethyl methyl semicarbazide, p,p'-bis-aminomethyl dibenzyl methyl amine, 2,6-diaminopyridine, 2-dimethylaminomethyl-2-methylpropane-1,3-diol.

In addition, the polyurethanes on which the polyurethane dispersions used in accordance with the invention are based contain a water-solubilizing functional component as an important component. This component may be selected from dihydroxy or even diamino compounds containing an ionizable carboxylic acid, sulfonic acid, amino or ammonium group. These compounds may either be used as such or may be prepared in situ. In order to introduce compounds bearing ionizable carboxylic acid groups into the polyurethane, the expert may add a dihydroxycarboxylic acid capable of salt formation to the polyols. A preferred dihydroxycarboxylic acid is, for example, dimethylol propionic acid.

In order to introduce sulfonic acid groups capable of salt formation, a diaminosulfonic acid may be added to the polyols. Examples are 2,4-diaminobenzenesulfonic acid and also the N-(ω-aminoalkane)-ω'-aminoalkanesulfonic acid described in DE 20 35 732. If they are anionically modified, the polymers are present in the polyurethane dispersions used in accordance with the invention in salt form. In the case of the preferred polymers modified with carboxylic acids or sulfonic acids, alkali metal salts, ammonia or amines, i.e. primary, secondary or tertiary amines, are present as counterions.

According to the invention, the neutralizing agents are preferably used in a stoichiometric ratio or in excess, based on acid groups.

Accordingly, the groups capable of salt formation may be partly or completely neutralized by the counterions. An excess of neutralizing agent is also possible.

In addition to or instead of the preferred modification with components capable of salt formation, nonionic modification can also induce solubility in water. Monoalcohols obtained by reaction of primary alcohols with ethylene oxide are primarily suitable for the nonionic modification. The necessary quantities of nonionic modifying agents is determined by the hydrophilicity of the system as a whole, i.e. it is lower where polyethylene glycol-based polyols have already been used as polyols in the synthesis of the polymer. The quantity is of course also lower when ionic groups are additionally incorporated. The upper limit is determined by the water resistance of the adhesive film. For example, up to 85% by weight of the polyurethane, based on the solid, may originate from ethylene oxide. In the absence of ionic modification, typical values are 5 to 50% by weight. Where ionic modifying agents are used, however, lower values may also be adjusted.

In addition, monohydric alcohols, more particularly ether alcohols, may additionally be used as nonionic hydrophilic modifying agents. The reaction products of $C_{1-10}$ alcohols with ethylene oxide in the molecular weight range up to 20,000 and preferably from 200 to 6,000 are preferred.

To produce the polyurethanes particularly suitable for the purposes according to the invention, the polyols and an excess of diisocyanate are reacted to form a polymer terminated by isocyanate groups, suitable reaction conditions and reaction times and also temperatures being variable according to the particular isocyanate. The expert knows that the reactivity of the constituents to be reacted necessitates a corresponding balance between the reaction rate and unwanted secondary reactions which can lead to discoloration and a reduction in molecular weight. Typically, the reaction is carried out with stirring over a period of about 1 to 6 hours at a temperature of approximately 50 to approximately 120° C. Further particulars of the production of suitable polyurethanes can be found in EP 405 329, to which is reference is expressly made.

However, the polyurethane dispersions used in the adhesive sticks according to the invention may also be produced without using acetone as a solvent. In this case, the starting materials may be the polyols preferred for the purposes of the invention based on polytetrahydrofuran or its copolymers with ethylene oxide or propylene oxide, low molecular weight polyols, for example those with a molecular weight of up to 2,000 or up to 1,000, preferably being used. The polyols are then reacted in the presence of a polyol bearing acid groups, i.e. for example dimethylol propionic acid, in an OH:NCO ratio of greater than 1:1.2 to form stirrable resins which may then be directly dispersed in water.

Clear or opaque polyurethane dispersions are preferably used for the purposes of the invention. In order to obtain substantially clear, i.e. transparent, opaque or water-clear polyurethane dispersions, it is important to maintain a certain ratio between the component capable of salt formation and the other components involved in the synthesis of the polyurethane. Thus, the component capable of salt formation, expressed as dimethylol propionic acid, is used in quantities of 1 to 30% by weight, preferably 2 to 20% by weight and more preferably 10 to 18% by weight, based on polyol. Based on polyurethane solids and expressed as dimethylol propionic acid, this corresponds to 5 to 35% by weight, preferably 5 to 20% by weight and more preferably 5 to 15% by weight. In addition, the transparency depends on the degree of neutralization. The expert is able by carrying out a few preliminary tests to determine the quantity of modifying agent capable of ion formation or the quantity of neutralizing agent beyond which an adequate degree of transparency is achieved. In general, as little of these substances as possible will be used because excessive use can affect the water resistance of the adhesive film.

An important factor in the production of the polyurethane dispersions on which the adhesive sticks according to the invention are based is the ratio of hydroxyl groups to isocyanate groups which may be between 1.0:0.8 and 1.0:4.0. Ratios of 1.0:1.1 to 1.0:2.0 are preferred, ratios of 1.0:1.1 to 1.0:1.8 being particularly preferred. Aqueous polyurethane dispersions with these ratios are particularly appropriate when they are a reaction product of a polyol mixture, a component capable of salt formation in alkaline solution and a polyisocyanate.

Suitable polyurethane dispersions may be prepared over a broad concentration range. Preparations with a solids content of 20 to 80% by weight are preferred, those with a solids content of 30 to 60% by weight being particularly preferred.

The polyurethane should make up from 10 to 60% by weight and, more particularly, from 15 to 35% by weight of the adhesive stick as a whole, based on the total weight of the polymers, the soap and other auxiliaries and water.

According to the invention, polyvinyl pyrrolidone (PVP) is used as a second polymer of adhesive character. It should have a molecular weight of at least about 10,000, more particularly of about 50,000 to 3,000,000 and, above all, of about 400,000 to 1.5 million. The PVP should be added in a quantity of 0.5 to 30% by weight and preferably in a quantity of 1 to 15% by weight, based on the adhesive as a whole. The percentage content of both adhesive polymers together should be between 15 and 65% by weight and preferably between 18 and 35% by weight.

The adhesive sticks according to the invention contain alkali metal salts, more particularly sodium salts, of $C_{12-22}$ fatty acids of natural or synthetic origin as soaps for forming the gel structure. $C_{14-18}$ fatty acid mixtures are preferred. The sodium salts of the fatty acids, i.e. the soaps, are present in quantities of 2 to 20% by weight and preferably 3 to 12% by weight, based on the adhesive stick.

The auxiliaries typically used in adhesive sticks may also be used in the adhesive sticks according to the invention in quantities of 0 to 25% by weight, based on the adhesive stick. The auxiliaries in question are, in particular, water-soluble plasticizers, dyes, perfumes, resins, preservatives and/or moisture regulators.

However, plasticizers and/or moisture regulators, i.e. organic water-soluble solvents typically used in adhesive sticks, are preferably not used for the purposes of the present invention. Nevertheless, these compounds may optionally be present in small quantities. The compounds in question are polyglycol ethers, more particularly polyethylene glycol and polypropylene glycol, the preferred polyethers having an average molecular weight in the range from 200 to 4,000 and preferably in the range from 500 to 2,000. In addition, polyhydric alcohols, such as glycerol, trimethylol propane, propylene glycol, sorbitol, sugar, polyglycerol, low molecular weight starch hydrolyzates and/or polyether glycols, may also be used. For example, a mixture of glycerol and polyethylene glycol may optionally be used. The nonvolatile organic solvents mentioned should be used in quantities of at most up to 50% by weight, based on the water content of the sticks.

In addition, other auxiliaries, for example substances which promote easy and soft rubbing, may also be used. Substances such as these are, for example, aminocarboxylic acids and/or their lactams. Suitable aminocarboxylic acids or lactams should contain up to 12 carbon atoms and more particularly from 4 to 8 carbon atoms. The preferred representative in terms of practical application is ε-caprolactam or the 7-aminocaproic acid derived therefrom. The quantity in which the lactams or corresponding aminocarboxylic acids are used is normally no more than 15% by weight and, for example, between 1% by weight and 10% by weight, based on the stick as a whole.

The adhesive sticks according to the invention may contain pigments, dyes, antioxidants, bitter substances, fillers, fragrances, preservatives, resins, water-soluble plasticizers and/or moisture regulators as further auxiliaries. These auxiliaries are present in the usual small quantities of 0 to about 20%, based on the adhesive stick as a whole. Examples of special dyes are pH- and heat-dependent dyes, optical brighteners, dyes designed to change color on application, particularly in the functional range. The dye may be uniformly distributed in the adhesive. However, structured coloration, for example a core/jacket structure, is also possible. Examples of pigments or fillers are graphite, talcum, $TiO_2$, highly disperse silica (Aerosil), bentonite, wollastonite, chalk, magnesium oxide and glass fibers. Other possible additives are, for example, dextrins, cellulose derivatives and non-destructured starch derivatives. Other additives which may be present in the adhesive sticks according to the invention are mannans, more particularly galactomannans. Galactomannans from the fruit of the carob tree and from guar flour are particularly suitable. The destructured ethers may also be replaced to a small extent by destructured mannans.

The individual components are preferably present in the adhesive stick in the following quantities: 3 to 10% by weight soaps, 15 to 65% by weight PU or PVP polymers and 0 to 25% by weight auxiliaries. The balance to 100% is water. Water is preferably present in a quantity of 35 to 65% by weight and more preferably 40 to 55% by weight, based on the adhesive stick as a whole.

To produce the adhesive sticks according to the invention, the soap-gel-forming constituents, the polyurethane dispersion, the PVP and the auxiliaries are mixed together, heated to temperatures of at least 50° C. and preferably up to 100° C. (or boiling point) until a uniform mixture is formed, the resulting mixture is poured into molds and is then left to cool in the absence of mechanical action to form a gel. These mixtures, which are easy to pour in the temperature range mentioned, are preferably poured directly into molds, more particularly into stick tubes or similar containers, and left to solidify in the absence of mechanical action to form the required gels. The adhesive stick is stored in a closable tube, more particularly of polyolefin. Although the tack is very high, the adhesive stick is displaceable in the tube.

Accordingly, the adhesive composition according to the invention is very easy to convert into stick form in the very tubes in which it will later be handled. This method of shaping is so simple that, after the original adhesive stick has been used up, anybody can make an easy-to-handle stick in the old tube simply by heating another adhesive composition according to the invention and pouring it into the stick tubes. In other words, the tube is reusable.

Since the adhesive stick according to the invention is solid and soft-rubbing, it is preferably used in geometric, more particularly cylindrical, form. The cylinder may have a circular, oval or polygonal cross-section. Its dimensions will be determined by the application, for example by the required width of the surface to be covered. Square blocks are also possible. The most appropriate form is determined by the application of the adhesive composition to the substrate.

The adhesive sticks according to the invention have the advantage of relatively high adhesive strength and, accordingly, may be used not only for gluing paper, but also and in particular paperboard, wall coverings, leather, wood, wood materials, plastics, glass, metals, ceramics, gypsum, to materials of the same or different kinds, more particularly for absorbent woods of other substrates, such as paperboard, even in combination with PVC, PMMA, PBS, aluminium.

By virtue of its high adhesive strength on many different substrates, the adhesive stick may be used as a "multipurpose adhesive", especially since its application from the tube is simple and uniform. Specific examples include handicrafts where the strengths of a conventional adhesive stick are unsatisfactory, such as the bonding of foam rubber to paperboard or wood. By virtue of its high heat resistance, the adhesive stick according to the invention is suitable for example for gluing window posters directly exposed to sunlight.

Although the PU and the PVP are soluble or dispersible in water, the water resistance of the bond is considerable. Thus, 20% of the original adhesive strength is present, for example, in a humid climate of 30° C./80% relative air humidity.

Mistakes and adhesive residues can easily be removed with alkaline water by covering the affected areas with a damp cloth for 10 minutes to soften the adhesive and then wiping off the remains.

The adhesive composition according to the invention sets relatively quickly by comparison with standard multipurpose adhesives, for example on wood/PVC. However, enough time remains for correction. The open time is between 10 and 120 seconds and preferably between 20 and 60 seconds.

The stick form is particularly convenient where the solid, soft-rubbing adhesive composition according to the invention is to be applied by hand. Other applications may be better served by other forms, for example a square form, where relatively large areas are to be coated by machine.

EXAMPLES

I. Starting Materials

1. Preparation of the Polyurethane Solutions or Dispersions

The polyurethane adhesive raw materials are produced by the acetone process, although other methods, for example dispersion of the extruded prepolymer melt (melt extrusion process), are possible. The polyisocyanates and diol components (polyether diol and dimethylol propionic acid) are introduced first and stirred under reflux at around 65 to 100° C. until the NCO value is constant. On completion of the reaction, the quantity of water indicated, which contains the calculated quantities of alkali and any chain extender, is added with vigorous stirring. Intensive shearing is very important to the quality and especially to the homogeneity of the dispersion. After stirring for several hours, the solvent is distilled off until the acetone concentration is well below 0.1 and the viscosities and solids contents shown in Table I below are reached.

2. A PVP with a K value of 90 (manufacturer: ISP) was used.
3. $\epsilon$-Caprolactam.
4. Sodium palmitate (Henkel KGaA).

TABLE I

| Polyurethane No. | I |
| --- | --- |
| Parts by weight water | 1363 |
| Parts by weight TMXDI | 242 |
| Parts by weight polypropylene glycol (MW 400) | 40 |
| Parts by weight polypropylene glycol (MW 1000) | 300 |
| Parts by weight polytetrahydrofuran (MW 850) | 65 |
| Parts by weight dimethylol propionic acid | 67 |
| Parts by weight NaOH (100%) | 20 |
| Solids content (%) | 35 |
| Viscosity at 20° C. (mPas) | 3500 |

II. Production of the Stick Compositions

The stick compositions are obtained by mixing the individual components in Table II at 65 to 100° C. and then pouring them into stick tubes to cool, the pH of the composition optionally being adjusted to a value of 8 to 11 by addition of a little dilute sodium hydroxide.

TABLE II

| Ingredient/Properties | Example 1 | Example 2 | Example 3 | Example 4 |
| --- | --- | --- | --- | --- |
| PU dispersion 35% solids, % by weight | 91 | 88 | 85 | 0 |
| PVP, % by weight | 0 | 3 | 6 | 26 + 65 water |
| $\epsilon$-Caprolactam, % by weight | 1 | 1 | 1 | 1 |
| Na palmitate | 8 | 8 | 8 | 8 |
| Tensile shear strengths on beech/beech MPa | 3 | 4 | 5.5 | 1.5 |
| Beech/PVC in MPa | 2.2 | 3.3 | 5.2 | 1.3 |
| Open time | 10 | 20 | 40 | 10 |
| Setting time (secs.) | 10 | 15 | 15 | 10 |
| Heat resistance ° C. | 55 | 75 | 100 | 100 |
| Tack | Medium | Good | Very good | Very poor |

III. Tests

1) Compressive Strength

Compressive strength is understood to be the maxmimum load measured parallel to the longitudinal axis on collapse of the stick under pressure. Compressive strength is measured with an Erichsen Model 464L compressive strength tester, measuring head 709 (manufacturer: Erichsen, Simonshöfchen, Wuppertal).

The adhesive cut off with a minimum length of 30 mm immediately above the piston is placed between two holders in the form of approx. 10 mm thick disks of rigid PVC which are formed with a circular 3 mm deep depression adapted to the particular stick diameters. The stick provided with the holders is placed centrally on the table of the compressive strength tester. The height of the force measuring instrument over the table is adapted to the height of the stick to be tested. The measuring head is then advanced against the stick to be tested at a rate of approx. 70 mm per minutes. On reaching the maximum compressive force, the value is read off from the digital display. The adhesive sticks according to the invention have a compressive strength of about 25 to 50 N/16 mm diameter.

2) Setting Time

To determine whether the adhesive properties of the sticks are sufficient for the application envisaged, bonding tests are carried out by hand under certain processing conditions and evaluated. The following procedure is adopted:

A supply of white chrome paper (weight per unit area approx. 100 g/m$^2$) coated on one side and adhesive sticks to be tested are conditioned for at least 24 hours at 20° C./65% relative air humidity. The test paper is cut into strips 5 cm wide and approx. 30 cm long. An adhesive stick is rubbed twice longitudinally under uniform pressure over the uncoated side of a paper strip and should produce a uniform film. Immediately afterwards, a second paper strip which has not been coated with adhesive is placed on the coated strip with its uncoated side facing inwards and rubbed on by hand. An attempt is then made to peel the paper strips slowly from one another. The time at which separation in the adhesion zone is only possible with tearing of paper over entire width characterizes the setting time.

3) Open Time

The open time is the time after application of the adhesive within which the materials to be bonded have to be fitted together in order, after setting, to obtain complete tearing of paper in the separation test. The method is the same as that used to determine setting time except that the strips of paper are only fitted together after defined times following application of the adhesive. Beginning with 15 seconds, the open time may be graduated, for example, in intervals of 15 seconds. With slow-setting adhesives having predictably longer open times, correspondingly longer intervals will be selected.

4) Rubbing

Rubbing is subjectively evaluated by at least two examiners. The performance properties are characterized and classified as follows: smooth, pliable, flat, crumbly, greasy, hard, soft and stringy.

5) Tensile Shear Strength of Wood/Wood Bonds

Beech wood test specimens and the PVC test specimens are rubbed with adhesive at their ends and fitted together in such a way that the two adhesive-covered ends overlap by 2 cm (bond area 2 cm×2.5 cm). The test specimens are fixed with two clamps and measured after 24 hours. The result is expressed in $N/mm^2$.

6) Heat Resistance

For preparation of the bonds, see testing of tensile shear strength. The pressure applied is 1.0 $N/mm^2$.

When ultimate strength has been developed after about 3 to 5 days at room temperature, the test specimens are hung up in a heating cabinet. A load of 1 kg is then applied to the bond. The heating cabinet increases the temperature in stages from 30° C. to 120° C. over a period of 30 hours. Standard program: 30° C. to 120° C. in 30 h, 10° C. temperature increase every 3 h. If the bond holds the weight for the entire duration of the program, the load is increased first to 2 kg and then to 5 kg. Each measurement is carried out on at least three bonds per adhesive.

The heat resistance of the adhesive is determined by comparing the measured time with the Table:

| H | 0–3.0 | 3–6 | 6–9 | 9–12 | 12–15 | 15–18 | 18–21 | 21–24 | 24–27 | 27–30 |
|---|---|---|---|---|---|---|---|---|---|---|
| ° C. | 30° C. | 40° C. | 50° C. | 60° C. | 70° C. | 80° C. | 90° C. | 100° C. | 110° C. | 120° C. |

7) Tack

The test is carried out in a standard climate of 23° C./50% relative air humidity using test specimens of beech plywood stored therein for at least 3 days.

Two wood test specimens measuring 80 mm×25 mm×4 mm are coated with the particular adhesive with a 20 mm long overlap corresponding to an overlap area of 500 $mm^2$, pressed together for 5 seconds under a pressure of 0.2 $N/mm^2$ and subjected to a shear force of 200 g immediately and after 2, 4, 6 and 8 mins. The test counts as having been passed if the parts no longer slide relative to one another after an hour.

Depending on the time required, tack is evaluated on the following scale:

| | |
|---|---|
| very good | immediately (0 mins.) |
| good | between 0 and 2 mins. |
| average | between 2 and 4 mins. |
| poor | between 4 and 6 mins |
| very poor | more than 6 mins. |

The test results (see Table II) show that the adhesive composition according to the invention based on the combination of both polymers leads to better tack and to higher heat resistance than the individual polymers on their own.

What is claimed is:

1. An adhesive stick comprised of
   (a) a shaping gel-forming substance comprised of a soap; and
   (b) a water-based preparation comprising polyurethane, which is a reaction product of one or more polyols having a molecular weight of 300 to 40,000 and one or more polyfunctional isocyanates, and polyvinyl pyrrolidone having a molecular weight greater than 400,000.

2. The adhesive stick of claim 1 wherein said polyurethane is in the form of a dispersion.

3. The adhesive stick of claim 1 wherein said polyurethane is a reaction product of at least one such polyol, at least one polyfunctional isocyanate, and one or more components selected from the group consisting of components capable of salt formation in alkaline aqueous solution and nonionic hydrophilic modifying agents.

4. The adhesive stick of claim 3 wherein at least one chain-extending agent is additionally used to produce said polyurethane.

5. The adhesive stick of claim 1 wherein said polyurethane is in the form of an aqueous dispersion and is a reaction product of (a) a mixture of such polyols (b) a component capable of salt formation in an alkaline aqueous solution and (c) a polyisocyanate in an OH:NCO ratio of 1.00:8 to 1.0.4.0.

6. The adhesive stick of claim 5 wherein the OH:NCO ratio is 1.0:1.1 to 1.0:2.0.

7. The adhesive stick of claim 5 wherein the OH:NCO ratio is 1.0:1.1 to 1.0:1.8.

8. The adhesive stick of claim 3 wherein the polyol is selected from the group consisting of polyether polyols, polyester polyols, and mixtures thereof.

9. The adhesive stick of claim 3 wherein at least one of said components is a dihydroxy carboxylic acid capable of salt formation in alkaline aqueous solution.

10. The adhesive stick of claim 3 wherein at least one polyfunctional isocyanate is selected from the group consisting of difunctional aliphatic isocyanates, trifunctional aliphatic isocyanates, and mixtures thereof.

11. The adhesive stick of claim 1 wherein the polyvinyl pyrrolidone has a molecular weight of up to 1.5 million.

12. The adhesive stick of claim 1 wherein said soap is comprised of sodium salts of $C_{12}$-$C_{22}$ fatty acids.

13. The adhesive stick of claim 1 additionally comprising one or more auxiliaries selected from the group consisting of water-soluble plasticizers, dyes, resins, preservatives, moisture regulators and mixtures thereof.

14. An adhesive stick comprised of
   (a) a shaping gel-forming substance comprised of sodium salts of $C_{12}$-$C_{22}$ fatty acids,
   (b) a water-based preparation comprising
      (i) a dispersed polyurethane which is a reaction product of one or more polyols having a molecular weight of 300 to 40,000, at least one polyfunctional isocyanate, and a component capable of salt formation in alkaline aqueous solution in an OH:NCO ratio of 1.0:0.8 to 1.0:4.0; and
      (ii) a polyvinyl pyrrolidone having a molecular weight greater than 400,000.

15. The adhesive stick of claim 14 wherein the component capable of salt formation is selected from the group consisting of dihydroxy and diamino compounds containing at least one ionizable carboxylic acid, sulfonic acid, amino or ammonium group.

16. The adhesive stick of claim 14 wherein the dispersed polyurethane has a solids content of 30 to 60% by weight.

17. The adhesive stick of claim 14 wherein the polyurethane of the polyurethane dispersion comprises from 15% to 35% by weight of the adhesive stick.

18. The adhesive stick of claim 14 wherein the polyvinyl pyrrolidone has a molecular weight of up to 1.5 million.

19. The adhesive stick of claim 14 wherein the polyvinyl pyrrolidone comprises from 1% to 15% by weight of the adhesive stick.

20. The adhesive stick of claim 14 wherein the sodium salts of $C_{12}$-$C_{22}$ fatty acids comprise 3 to 12% by weight of the adhesive stick.

21. The adhesive stick of claim 14 additionally comprising at least one amino carboxylic acid or lactam.

22. A method of making an adhesive stick comprising the steps of:
(a) mixing together a soap, a polyurethane dispersion which is a reaction product of one or more polyols having a molecular weight of 300 to 40,000, at least one polyfunctional isocyanate, and a polyvinyl pyrrolidone having a molecular weight greater than 400,000 to form a mixture;
(b) heating said mixture at a temperature of at least 50° C. for a time effective to render said mixture uniform;
(c) pouring said uniform mixture into a mold; and
(d) cooling the uniform mixture in the mold without any mechanical action until a gel is formed.

23. A method for bonding a first material to a second material, wherein the adhesive stick of claim 1 is used to bond said first material to said second material.

24. A method for bonding a first material to a second material, said first material and second material being independently selected from the group consisting of paper, paperboard, wood, foam rubber, gypsum, leather, plastic, ceramic and glass, wherein the adhesive stick of claim 14 is rubbed onto said first material to coat the first material with adhesive and said adhesive coated on said first material is used to bond said first material to said second material.

* * * * *

UNITED STATES PATENT AND TRADEMARK OFFICE
CERTIFICATE OF CORRECTION

PATENT NO.    : 6,417,261 B1
DATED         : July 9, 2002
INVENTOR(S)   : Maier et al.

It is certified that error appears in the above-identified patent and that said Letters Patent is hereby corrected as shown below:

<u>Column 12,</u>
Line 23, after "polyols", insert therefor -- , --
Line 26, delete "1.00:8 to 1.0.4.0", and insert therefor -- 1.0:0.8 to 1.0:4.0 --
Line 58, delete ",", and insert therefor -- ; --

Signed and Sealed this

Eighteenth Day of March, 2003

JAMES E. ROGAN
*Director of the United States Patent and Trademark Office*